United States Patent [19]

Jones

[11] 4,107,730
[45] Aug. 15, 1978

[54] SIGNAL STRENGTH RESPONSIVE SOUND TRAP

[75] Inventor: Gary A. Jones, Arlington Heights, Ill.

[73] Assignee: Zenith Radio Corporation, Glenview, Ill.

[21] Appl. No.: 773,722

[22] Filed: Mar. 2, 1977

[51] Int. Cl.² .............................................. H04N 9/535
[52] U.S. Cl. ....................................... 358/37; 358/196; 358/904
[58] Field of Search ................ 325/427; 358/904, 196, 358/37

[56] References Cited

U.S. PATENT DOCUMENTS

| 2,901,535 | 8/1959 | Smith | 358/196 |
| 2,901,537 | 8/1959 | Comninos | 358/904 X |
| 3,872,387 | 3/1975 | Banach | 325/427 |

Primary Examiner—Robert L. Richardson
Attorney, Agent, or Firm—Nicholas A. Camasto

[57] ABSTRACT

A television receiver signal translating system includes a tuner frequency-converting a received broadcast signal to an intermediate frequency signal. An acoustic surface wave filter and gain controlled amplifier are coupled to the tuner and drive a synchronous detecting system. An automatic gain control (AGC) maintains the output of recovered signal constant while a variable bandwidth stage changes the system frequency response as a function of signal strength. A variable influence sound carrier trap responds to the AGC providing increased sound carrier attenuation when strong signals are received and reduced attenuation during weak signal reception.

2 Claims, 4 Drawing Figures

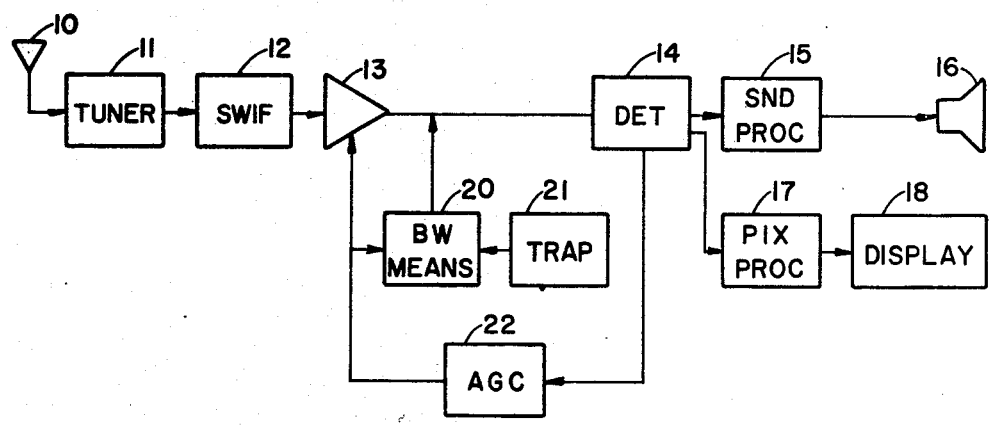

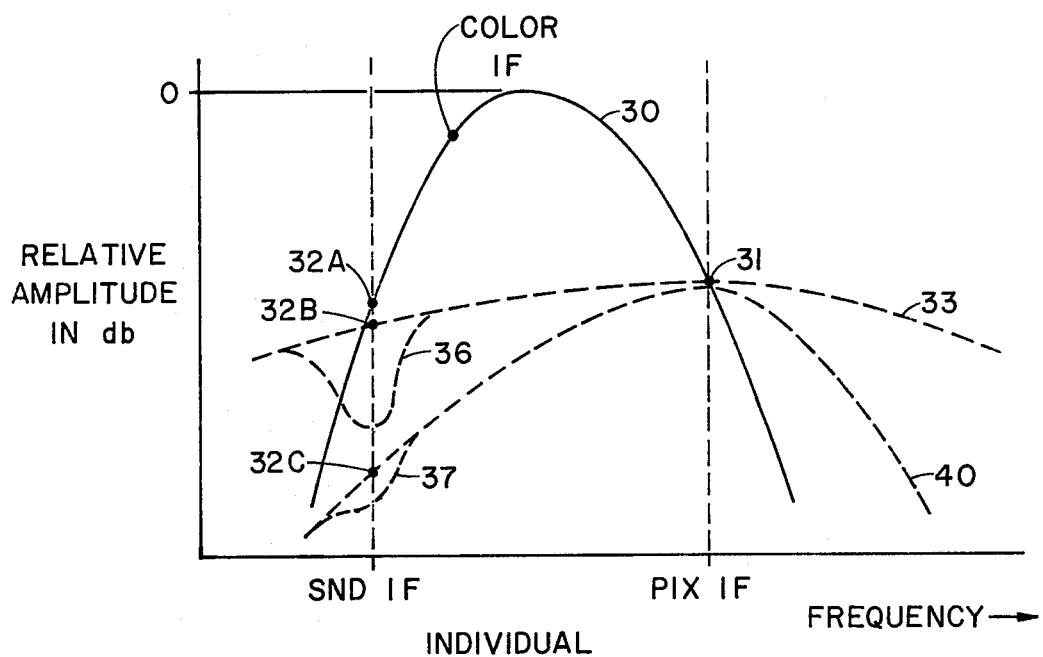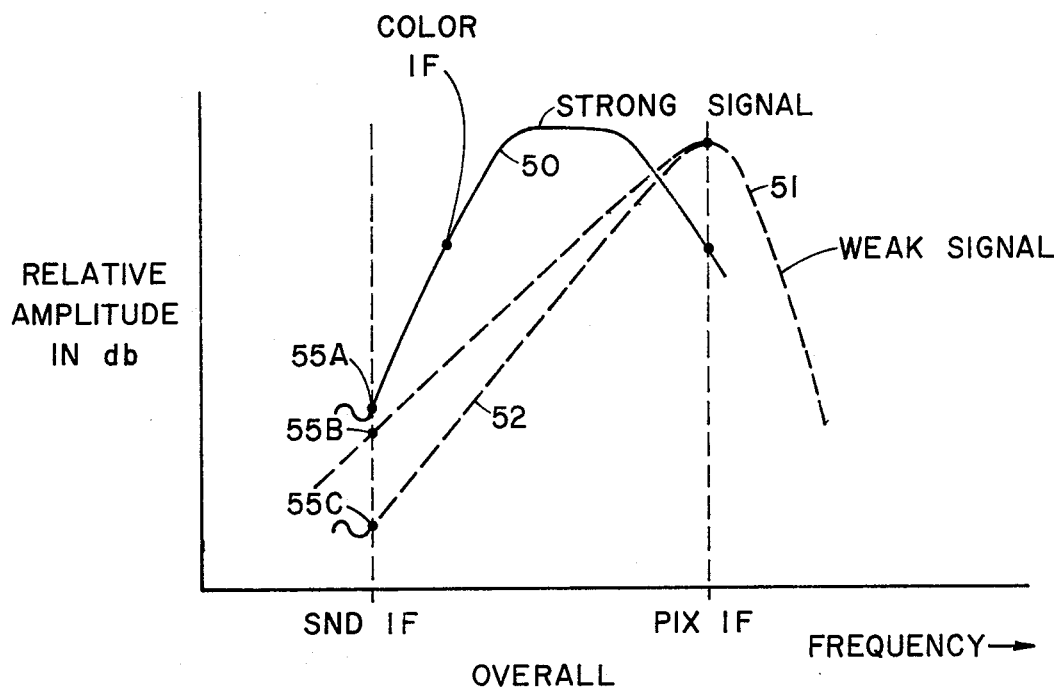

SIGNAL STRENGTH RESPONSIVE SOUND TRAP

BACKGROUND OF THE INVENTION

This invention pertains generally to television receivers. In particular it pertains to means for altering the overall frequency response of a television IF (intermediate frequency) amplifier system whose frequency response is determined in part by nonvariable tuning elements such as acoustic filters commonly called SWIFs (surface wave integratable filters).

Basically, an acoustic surface wave device comprises a piezoelectric medium propagative of acoustic surface waves having an input transducer coupled to the propagating surface of the medium for launching acoustic surface waves in response to an applied electrical signal. The waves propagate across the surface to one or more output or receiving transducers also coupled to the medium. An electrical output is generated by the interaction of the output transducer(s) and the propagating acoustic surface waves. By appropriate selection of the medium material and the design of the transducers, a wide variety of different frequency selective characteristics may be obtained. In addition, one or more SWIFs may be connected in a signal transmission path to provide additional selectivity.

These acoustic wave devices may be fabricated by integrated circuit technology such that the entire frequency selection of an IF amplifier can be realized on a small piezoelectric substrate. Because of their small size and method of fabrication, SWIFs lend themselves readily to use in the compact low signal level environment typical of solid state systems, particularly those using integrated circuits.

The characteristics of SWIFs which make their use in IF amplifiers desirable also impose certain limitations on their use. While their ability to be mass-produced in accordance with integrated circuit technology and the fact that their fixed geometry provides a fixed predetermined frequency response offers obvious advantages, it also imposes a limitation on their application in television systems due to an inability to vary their frequency response.

It has been found by practitioners in the television art that it is desirable under some conditions to alter the frequency response of the IF amplifier. For example, it is often advantageous to vary IF system response as a function of the strength of signal received. Normally (that is when a strong signal is received) the picture IF and sound IF carriers are positioned on opposite slopes of the IF bandpass curve. Typically the picture IF carrier is approximately 6 decibels (dB) below the peak response. The strong signal level of the sound IF carrier is approximately 10 to 20dB below peak response. However, when the strength of signal received decreases substantially, the well-known action of the AGC (automatic gain control) system responds by increasing system gain which maintains the amplitude of the IF signal at its preselected level. Unfortunately this increased gain also increases the noise content of the signal which manifests itself as "snow" or graininess in the displayed image. For these reasons, it has been found to be desirable to adjust the frequency response of the IF amplifier such that the picture carrier is emphasized, that is, positioned at the peak of the IF response curve. This procedure effectively enhances the gain of the IF amplifier at the frequency of the picture carrier. Because the gain of the IF amplifier is increased primarily for signal components at or near the picture IF carrier frequency, the noise components of the signal (generally signals away from the picture IF carrier) are reduced.

Methods of such picture carrier enhancement are set forth in the U.S. Pat. No. 3,872,387 issued to Frank G. Banach and assigned to the assignee of the present invention which shows a variable bandwidth means having a passband substantially centered at the picture IF carrier frequency. The bandwidth means are responsive to the control voltage of the AGC system. Under strond signal conditions the bandwidth means exhibit a broad passband and have little effect upon the overall IF system frequency characteristic. Under weak signal conditions the bandwidth means exhibit a narrow passband enhancing the picture IF carrier relative to the remainder of the IF signal components.

Such systems perform well and achieve substantial performance improvements. They are particularly effective when used in receivers having separate detectors for the picture and sound IF carriers. Some difficulties are found however when a common detector is used to recover both the picture and sound information such with the synchronous demodulation systems which are now finding increased use in the television art. In such detectors, there is an acceptable range of sound IF carrier levels which can be properly detected. Excessive sound IF carrier results in undesired production of "cross product" interference signals. The most apparent of which is the well-known chrominance-sound beat which results in a 920KHz interference signal in the displayed image. Insufficient sound IF carrier on the other hand leads to objectionably "noisy" audio reproduction or even total loss of audio output. With this limitation on strong signal sound IF carrier level, a difficulty arises in variable bandwidth systems because the change of IF system bandwidth under weak signal conditions reduces not only the noise components, but also the amplitude of the sound IF carrier available for detection. Until now, this effect has resulted in a limitation upon the degree of bandwidth variation used in fixed-tuned IF systems.

Accordingly, it is a broad object of the present invention to provide an improved fixed-tuned IF amplifier system for use in a television receiver. It is a more particular objective to provide bandwidth variation of a fixed-tuned IF amplifier without objectionable loss of sound information components.

SUMMARY OF THE INVENTION

In accordance with the invention a color television receiver includes a tuner for developing an intermediate frequency picture carrier and an intermediate frequency sound carrier from a received color television signal, an IF amplifier system including a variable gain amplifier and a SWIF filter, picture carrier enhancement means including a transistor, synchronous detector means requiring sound carrier trapping in the presence of abnormally strong signals to preclude generating a 920KHz sound-chrominance beat, AGC means controlling said variable gain amplifier and conduction of said transistor in said picture carrier enhancement means to sharpen receiver response to said picture carrier under weak signal conditions, and an absorption trap tuned to the sound carrier frequency in circuit with said transistor such that for said abnormally strong signals the trap is effective and precludes said 920KHz beat and for weak signals the trap is rendered ineffective, and sound carrier amplitude is maintained.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

FIG. 2 is a family of individual response curves for portions of the novel translating system.

FIG. 3 is a family of overall response curves for the novel system.

DESCRIPTION OF THE PREFERRED EMBODIMENT

Figure 1:
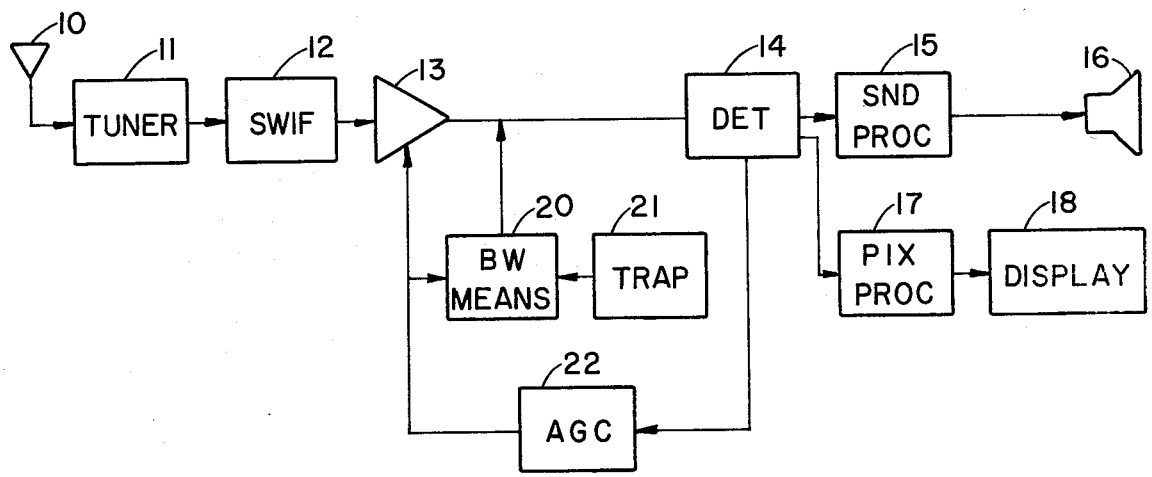
FIG. 1 is a block diagram representation of a signal translating system for a television receiver constructed in accordance with the invention.

FIG. 1 shows the signal translating portion of a television receiver constructed in accordance with the present invention. An antenna 10 is coupled to a tuner 11, the output of which is coupled to a surface wave integratable filter 12. The output of filter 12 is coupled to the input of a variable gain amplifier 13, the output of which is coupled to a detector 14. Detector 14 is coupled to a sound processor 15 and a picture processor 17. The output of the former is coupled to a speaker 16 and the output of the latter is coupled to a display means 18. Detector 14 also produces an output which is coupled to an AGC means 22 which in turn is coupled to the gain control input of amplifier 13 and bandwidth means 20. Bandwidth means 20 are coupled to the output of amplifier 13 and trap means 21 are coupled to bandwidth means 20.

For ease of explanation of the operation of the present invention system, the operations of bandwidth means 20 and trap means 21 will temporarily be omitted and described below. A broadcast signal incident upon antenna 10 drives tuner 11 which by the familiar heterodyning process converts the broadcast signal to an intermediate frequency (IF) signal which is applied to IF filter 12. Filter 12 has a predetermined passband characteristic (shown as curve 30 in FIG. 2) and forms the major frequency selective element in the signal translating system. The output signal of filter 12 forms the input signal of gain controlled amplifier 13 which raises the applied signal to a level sufficient to facilitate detection. Detector 14, which includes well-known synchronous detection circuitry, recovers both sound and picture information components together with deflection synchronization information components. The latter comprise pulse-like signals representative of unmodulated carrier amplitude and therefore provide a convenient source of signal strength information for AGC system 22.

AGC means 22 perform the well-known gain control function assuring a substantially constant input signal level at detector 14. By comparing the amplitude of recovered signal (synchronizing pulses) to an internally produced reference (generally a stable voltage supply) a control, or error, voltage representative of their difference is produced. This control voltage is applied to the gain control input of amplifier 13 in such a manner that the amplifier gain is varied in an inverse relationship to the amplitude of received IF signal. As a result, the AGC control voltage provides a convenient signal for use by other systems which are intended to react to the amplitude (or strength) of the received signal. The importance of this characteristic to the present invention will be more apparent in the discussions below in connection with bandwidth means 20 and trapping means 21. The recovered modulation components produced by detector 14 are applied to sound and picture processors 15 and 17 respectively and drive appropriate transducers, that is, speaker 16 and display means 18.

Sound processor 15 includes well-known frequency detection circuitry for recovery of the frequency modulated sound information. Similarly, picture processor 17 should be understood to include well-known circuitry for processing the liminance and chrominance components of the signal's picture information. Finally, display means 18 includes the well-known image producing system typical of television receivers, namely, a cathode ray tube (CRT) and associated deflection circuitry.

It will be apparent to those skilled in the art that the above-described portion of the present invention translating system (exclusive of bandwidth means 20 and trapping means 21) is entirely conventional and may be constructed in any number of well-known appropriate ways to perform the above-described functions without departing from the spirit of the present invention. For example, detector 14 may be any detection system which simultaneously receives both sound and picture IF carriers from a common input. Similarly, filter 12 may be any fixed-tuned IF filter or any prealigned "alignable" filter such as cascaded tuned filter sections.

Turning now to the operation of bandwidth means 20 and trap means 21, attention is directed to the group of individual response curves shown in FIG. 2. Bandwidth means 20 includes a variable bandwidth network of the type disclosed in U.S. Pat. No. 3,872,387 issued to Frank G. Banach and assigned to the assignee of the present invention. In response to the AGC control voltage, bandwidth means 20 provides a variable bandwidth filter characteristic changing between a broad "low Q" response (shown in FIG. 2 as dashed curve 33) and a more narrow "high Q" response shown as dashed line 40 in FIG. 2 under weak signal conditions. As set forth in the above-mentioned U.S. Pat., the purpose of bandwidth means 20 is to supplement the response of filter 12 and provide enhancement of the overall system response at the picture IF carrier frequency under weak signal conditions. The frequency response of the entire translating system of FIG. 1 is equal to the combined effect of the individual frequency characteristics of filter 12 and bandwidth means 20 together with that of trap means 21 (described below). As may be seen, the effect of the narrowed bandwidth presented by bandwidth means 20 under weak signal conditions upon overall response provides a substantial reduction in the amplitude of the sound IF carrier available to detector 14. Under the weak signal conditions depicted by curve 40, the loss of sound carrier information becomes critical.

Trap means 21 which provide selective attenuation of the sound IF carrier and signals associated therewith are coupled to bandwidth means 20 is such a manner (described below) that the degree of influence of trap means 21 on the overall frequency response of the above system varies inversely with the bandwidth of bandwidth means 20. In other words, under strong signal conditions, the control voltage produced by AGC means 22 causes bandwidth means 20 to exhibit a broad passband and trap means 21 to have a maximum influence upon the overall system response. Conversely, under weak signal conditions, the AGC control voltage causes bandwidth means 20 to produce a narrow passband and trap means 21 to have a minimum influence upon the overall system response. As a result, the action of trap means 21 compensates for the changes of sound carrier caused by bandwidth means 20 by providing a "reverse" effect upon sound carrier amplitude.

The effect of trap means 20 upon the frequency characteristic of the bandwidth means is illustrated by dashed curves 36 and 37 in FIG. 2. Under strong signal conditions, trap means 21 provide substantial attenuation of the sound carrier as evidenced by the "notch" of curve 36. However, under weak signal conditions, the cooperation of trap means 21 and bandwidth means 20 reduce the influence of trap means 21 on the overall system response such that the lesser attenuation (shown by dashed line 37) results.

When interpreting the individual response curves of FIG. 2, it must be remembered that as the amplitude of received signal varies, AGC means 20 variable gain amplifier 13 cooperate to maintain the amplitude of picture IF carrier constant making analysis of the individual responses difficult. Accordingly, the function of the present invention trap means is best understood by reference to the overall system frequency characteristics shown in FIG. 3. The overall system frequency response under strong signal conditions with the trap is shown by curve 50 while the system response to weak signal conditions with the trap is shown by curve 51. In addition, for comparison purposes, the overall system response under weak signal conditions without the effect of trap means 21 being reduced by the AGC is shown by dashed line curve 52. In each of the three curves, the amplitude of sound IF carrier is depicted by the intercept of the response curve with a vertical line extending upward at the sound IF on the horizontal axis. Comparison of curves 50, 51 and 52 shows that while some minor reduction of sound IF carrier amplitude does occur between strong signal (intercept 55a on curve 50) and weak signal conditions (intercept 55b on curve 51), the attenuation of the sound IF carrier is substantially less than that resulting in the presence of trap means 21 but without diminishing its effect (the difference between intercept 55a and intercept 55c on curve 52).

Figure 4:
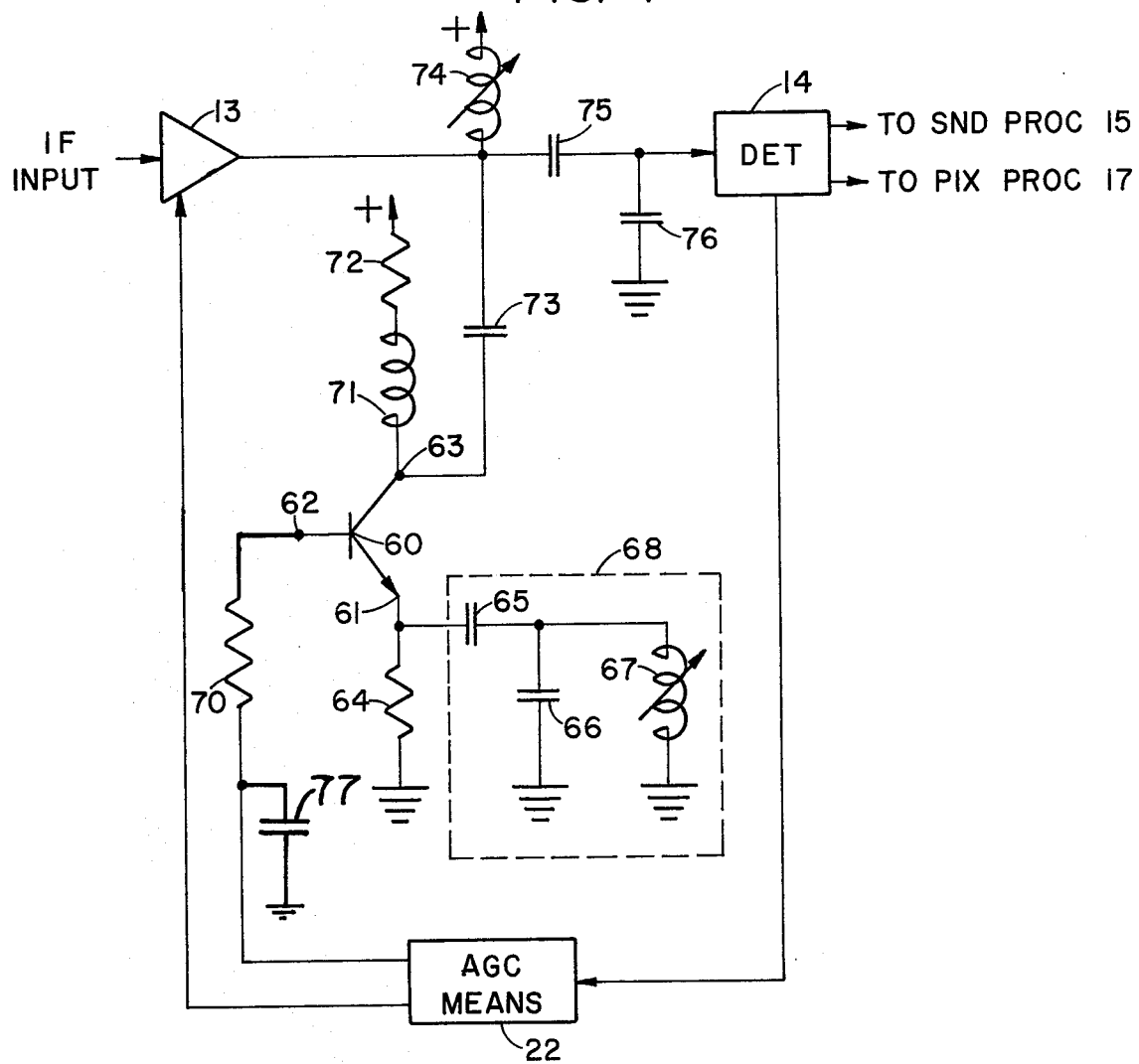
FIG. 4 is a schematic detail of a portion of the translating system set forth in FIG. 1.

FIG. 4 shows a schematic detail of bandwidth means 20 and trap means 21. The IF signal output of gain controlled amplifier 13 is coupled by a capacitor 75 to the input of detector 14. A maximum gain adjust coil 74 couples the output of amplifier 13 to a source of positive voltage and a capacitor 76 is coupled between the input of detector 14 and ground. A transistor 60 has an emitter electrode 61 coupled to ground by a resistor 64, a base electrode 62 coupled to the output of AGC means 22 by a resistor 70 and a collector electrode 63 coupled to the IF output of amplifier 13 by a capacitor 73. A series inductive and resistive combination formed by a coil 71 and a resistor 72 couples collector 63 to a source of positive operating voltage. A capacitor 65 couples emitter 61 to a parallel combination of a capacitor 66 and a tunable inductor 67, the other ends of which are connected to ground.

Coil 74 and capacitor 75 and 76 form a tuned resonant circuit having a frequency maximum which is adjusted (by tuning coil 74) to be centered about the picture IF carrier frequency. Capacitor 73 is selected to have a very low impedance to the IF signal thereby effectively connecting collector 63 to the junction of capacitor 75 and coil 74 for IF signals. As a result, the combination of the emitter-to-collector and base-to-collector paths of transistor 60 and resistors 64 and 70 form conductive paths substantially in parallel with coil 74 and the series combination of capacitors 75 and 76. The impedances of these paths vary as a function of transistor conduction and changes of voltage applied to base 62 (i.e., derived by AGC means 22) changed the impedance in parallel with the tuned network of coil 74 and capacitors 75 and 76. Under strong signal conditions, the AGC derived voltage applied to base 62 causes transistor 60 to saturate which effectively places resistors 64 and 72 in parallel with the combination of coil 74 and capacitors 75 and 76 reducing the "Q" of the tuned circuit thereby producing a broad bandwidth which has a reduced effect upon the overall system frequency response.

Capacitors 65 and 66 together with coil 67 form an absorption trap 68 in which coil 67 is adjusted to provide the desired absorption of the sound IF carrier and associated frequencies. This "sound" trap is coupled to the output of amplifier 13 via the emitter-to-collector path of transistor 60 and coupling capacitor 73. As mentioned, capacitor 73 has a low impednace to IF signals, therefore the degree of influence of the sound trap network is determined largely by the conduction of transistor 60. Under strong signal conditions, the high degree of coupling between emitter 61 and the output of amplifier 13 causes the absorption trap to substantially reduce or attenuate the sound IF carrier signal present, which of course reduces the amount thereof applied to detector 14.

Under weak signal conditions, the control voltage produced by AGC means 22 and applied to base 62 causes reduced conduction by transistor 60 which effectively removes the parallel influence of resistors 64 and 62 upon the combination of coil 74 and capacitors 75 and 76 thereby increasing the "Q" of the network and providing a narrow bandwidth response which causes enhancement of the picture IF carrier and associated frequencies coupled to detector 14. Correspondingly, the reduced conduction of transistor 60 reduces the degree of coupling between absorption trap 68 and the output of amplifier 13. This causes a lesser influence of the sound trap and reduced attenuation of the sound IF carrier signal applied to detector 14.

It will be apparent to those skilled in the television art that sound trap network 68 may also be coupled to the output of amplifier 13 via an individual transistor or the like controlled by AGC means 22 without departing from the spirit of the present invention. It will be equally apparent that the variable influence coupling of trap 68 may be achieved by using any member of known resonant networks and that the placement of the coupling may be changed to other points within the signal translating system.

What has been shown is an improved signal translating system in which the AGC voltage, which is of course indictive of the strength or amplitude of IF carrier present, is used to selectively increase or decrease the degree of sound carrier attenuation occurring in the system as a function of signal strength. Under strong signal conditions, when it is desirable that the amplitude of sound IF carrier present be reduced, maximum coupling between these sound trap and the remainder of the channel is achieved. Conversely, under weak signal conditions, when in order to optimize sound performance, it is desirable to maintain maximum sound carrier, the sound trap is effectively isolated from the remainder of the system.

What is claimed is:

1. In a color television reciever including; a tuner developing an intermediate frequency picture carrier and an intermediate frequency sound carrier from a received color television signal; an IF amplifier system including a variable gain amplifier and a surface wave integratable acoustic filter; AGC means; picture carrier enhancement means including a transistor; synchronous detector means, said synchronous detector means requiring sound carrier trapping in the presence of abnormally strong signals to preclude generation of a 920KHz sound-chrominance interference beat; said AGC means controlling said variable gain amplifier and conduction of said transistor in said picture carrier enhancement means to sharpen receiver response to the picture carrier under weak signal conditions, the improvement comprising:

an absorption trap tuned to the frequency of the sound carrier in circuit with said transistor such that for said abnormally strong signals, said trap is fully effective and precludes generation of said 920KHz beat and for weak signals said trap is ineffective and sound carrier amplitude is maintained.

2. In a color television receiver as set forth in claim 1 wherein said transistor includes a base coupled to said AGC means and an emitter resistor, said absorption trap being coupled across said emitter resistor.

* * * * *